Aug. 15, 1967 K. BAJORAT ET AL 3,336,588
ROTARY ANALOG-DIGITAL CONVERTER
Filed June 10, 1963 2 Sheets-Sheet 1

Inventors:
Heinz-Günter Lott
Klaus Bajorat
By: Spencer & Kaye
Attorneys

ROTARY ANALOG-DIGITAL CONVERTER

Filed June 10, 1963 2 Sheets-Sheet 2

Inventors:
Heinz-Günter Lott
Klaus Bajorat
By: Spencer & Kaye
Attorneys

United States Patent Office 3,336,588
Patented Aug. 15, 1967

3,336,588

ROTARY ANALOG-DIGITAL CONVERTER

Klaus Bajorat, Berlin-Wilmersdorf, and Heinz Günter Lott, Neu-Isenburg, Germany, assignors to Licentia Patent-Verwaltungs-G.m.b.H., Frankfurt am Main, Germany Filed June 10, 1963, Ser. No. 286,770
7 Claims. (Cl. 340—347)

The present invention relates to an analog-digital converter.

There exist rotary analog-digital converters which can be used, for example, in conjunction with machine tools. Such converters can be used in the measurement of angles as well as in the measurement of the position of the work tool relative to the work piece, or vice versa. The rotary converters generally use digitally coded scales in the form of discs. Such discs are provided with a plurality of circuit raster-like tracks each of which has a particular value (e.g., $2^0$, $2^1$, $2^2$, etc.) depending on the code. The tracks are provided with black and white divisions which can be read photoelectrically. The scanning devices for reading the tracks can be constituted by suitable photoelectric elements, such as photodiodes, photoresistances, or the like. In order to avoid any ambiguity or error in the read-out, each track may have two scanning devices associated with it, which two scanning devices are spaced from each other by a given distance. The scanning devices pertaining to all of the tracks are interconnected by means of a logic circuit so as to produce an output which is indicative of the location along the scale. Such a scanning arrangement is generally known as a double or V-type scanner. The positions of the divisions are put out as binary signals (O or L, where L=binary 1).

Converters which are used with machine tools must be sufficiently sturdy in order to remain operative despite heavy work done by the machine tool. Also, the converters should not be too large so as to make it possible to use such converters with machines under conditions where but limited space is available. On the other hand, the converters should be such as to operate with a sufficient bit-width; in practice, widths of 18 to 20 bits are required. If the diameter of a digitally coded scale is to be no larger than approximately 120 mm., all that can readily be accommodated on such discs are 5 or so tracks because the remainder of the surface of the area of the disc is needed in order to mount the disc. Thus, if there is to be a width of 20 bits, there have to be four code discs of 5 raster tracks each. These discs are then stacked, and the drive shafts for the individual discs are suitably coupled to each other. It will be appreciated, therefore, that a converter incorporating a plurality of such discs must of necessity have a relatively large depth. Also, the code discs are generally made of glass and are therefore vulnerable to breakage, which is particularly undesirable when the converter is to be subjected to more or less rough working conditions. Furthermore, special equipment is required to apply the raster tracks onto the code discs, so that the manufacture of such discs entails great expense.

It is, therefore, an object of the present invention to provide an analog-digital converter which overcomes the above-mentioned drawbacks of heretofore known rotary converters, and with this object in view, the present invention resides in a converter which dispenses completely with code discs. Moreover, a converter according to the present invention having the same diameter as heretofore known converters is able to handle a bit-width of 18 to 20, while at the same time being of very small depth.

More particularly, the present invention resides in a converter which comprises a plurality of rotatably mounted light stops, hereinafter referred to as shutters, which are arranged next to each other, generally in one plane and which are coupled to each other by means of reduction gearing, which shutters control photoelectric elements associated with the respective shutters. In practice, the shutters and the respective photoelectric elements will be arranged about a circle. According to a further feature of the present invention, the light source for the photoelectric elements is arranged within the circle along which the shutters and photoelectric elements are arranged.

In one embodiment of the present invention, the shutters are cylindrical and have openings at the circumferences with the photoelectric elements being fixedly mounted within the cylindrical shutters, while in another embodiment, the shutters are constituted by semi-circular discs which sweep the photoelectric elements.

Additional objects and advantages of the present invention will become apparent upon consideration of the following description when taken in conjunction with the accompanying drawings in which.

Figure 1:
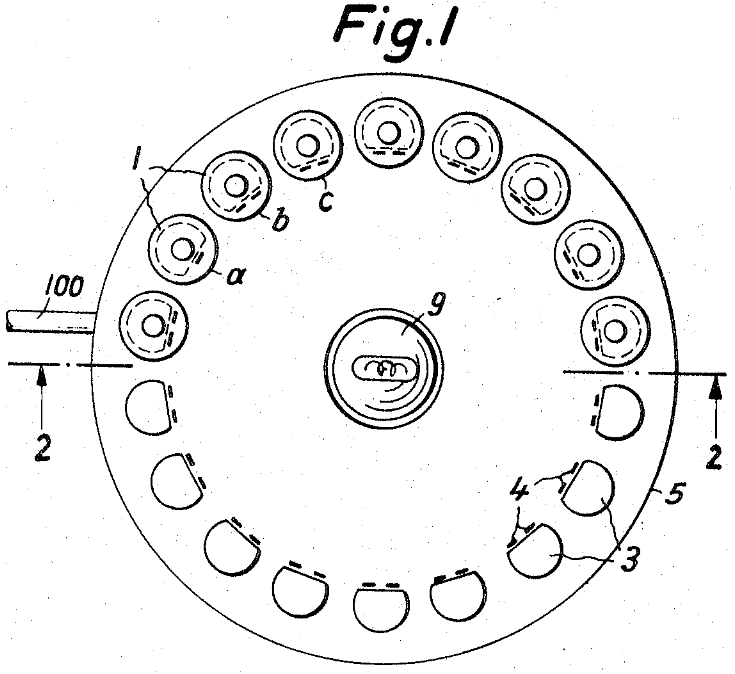
FIGURE 1 is a plan view of one embodiment of a converter according to the present invention, without a cover, taken along line 1—1 of FIGURE 2.
Figure 2:
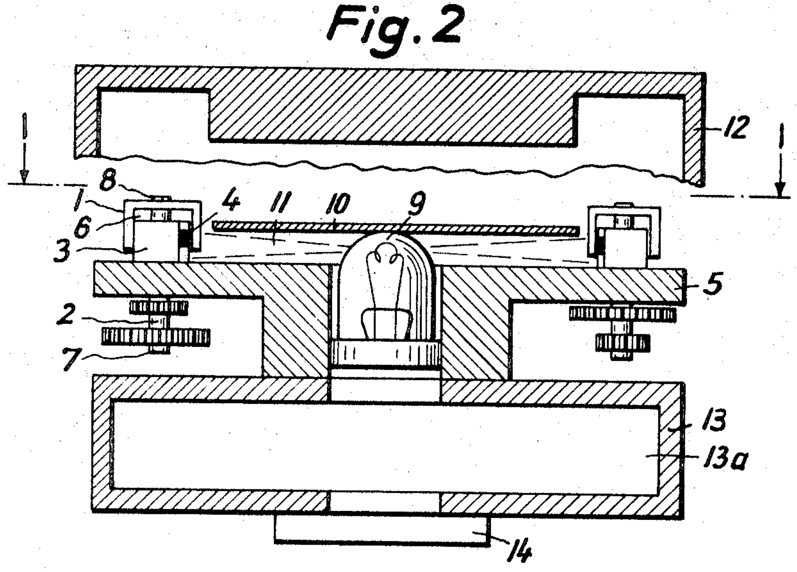
FIGURE 2 is a sectional view of the converter illustrated in FIGURE 1, taken along line 2—2 of FIGURE 1.

Referring now to the drawing and to FIGURES 1 and 2 thereof in particular, the same show a converter which includes a plurality of cylindrical shutters 1 that are connected to each other by means of reduction gearing indicated generally at 2. For purposes of clarity, FIGURE 2 shows but two of the cylindrical shutters, while in FIGURE 1, the shutters 1 are shown only in the upper half of the figure, the lower half showing only carriers 3 which are fixedly mounted on a plate 5 and which carry photoelectric elements 4. Shutters 1 are, of course, also provided for the components 3, 4, illustrated in the lower half of FIGURE 1, and each shutter 1 is rotatable about its respective component 3, 4. The shutters 1 are provided with openings 6, as shown in FIGURE 2. The shafts 7 of the gearings 2 extend through the fixedly mounted carriers 3, and the shutters 1 are suitably attached to the upper ends 8 of the respective shafts 7.

As is apparent from FIGURE 1, the components 3, 4, and their respective shutters 1 are arranged along a circle, and a light source 9 is arranged within this circle, preferably at the center thereof as illustrated. A disc 10 which is arranged above the light source 9 and is secured to the plate 5 in any suitable manner, confines the light emitted by the light source 9 to shine along a radially emanating channel 11. Also shown is a cover plate 12 which overlies the plate 5 and covers the disc 10 and the shutters 1 which are rotatably mounted about the components 3, 4.

The plate 5 is mounted on a support 13 which contains the electrical components of the logic circuit 13*a* to which the photoelectric elements 4 are connected, such as the resistors, transistors, diodes and the like. For the sake of simplicity, the logic circuit is not illustrated in detail; in practice, the same may be arranged as shown, for example, in FIGURE 6 of co-pending application of Elmar Götz and Wolfgang Pabst, Ser. No. 255,485, filed Feb. 1, 1963, now Patent No. 3,257,656, issued June 21, 1966. The output of the logic circuit 13*a* may be taken off via an output connector or plug 14.

The converter is driven by means of an input shaft 100 connected with the gearing 2 of one of the shutters 1. This will cause the other shutters 1, connected to the input shutter via the gearings 2, to be rotated at a rate dependent on the gear ratio so that the shutters 1 are rotated and cover and uncover the photoelectric elements 1 in accordance with the movement of the input shaft 100. Consequently, the centrally arranged light source 9 will periodically illuminate or not illuminate the photoelectric elements 4, so that there will appear signals O or L at the outputs of the photoelectric elements, which signals are then processed by the logic circuit 13*a*, in the manner fully disclosed in the above-mentioned Patent No. 3,257,656.

Each shutter together with its photoelectric elements represents one binary digit of a given order. For example, if the input shaft, shown schematically in FIGURE 1 at 100, is connected to the shutter referenced *a*, then the unit composed of that shutter and the corresponding components 3, 4, will have the order $2^0$. The next unit *b* will have the order $2^1$, unit *c* the order $2^2$, and so on. Accordingly, the gear ratio between each shutter will be 2:1, i.e., each two revolutions of shutter *a* will produce one revolution of shutter *b*, each two revolutions of shutter *b* will produce one revolution of shutter *c*, and so on. There being a total of 18 units, the converter is able to produce as its output a binary number having 18 digits, i.e., a number having 18 bits.

As set forth above, normally four, and certainly at least three, stacked code discs would have to be provided in heretofore known converters in order to obtain a number having 18 digits. It will be appreciated, therefore, that the converter described above is substantially less deep than a converter having three or more stacked discs.

Figure 3:
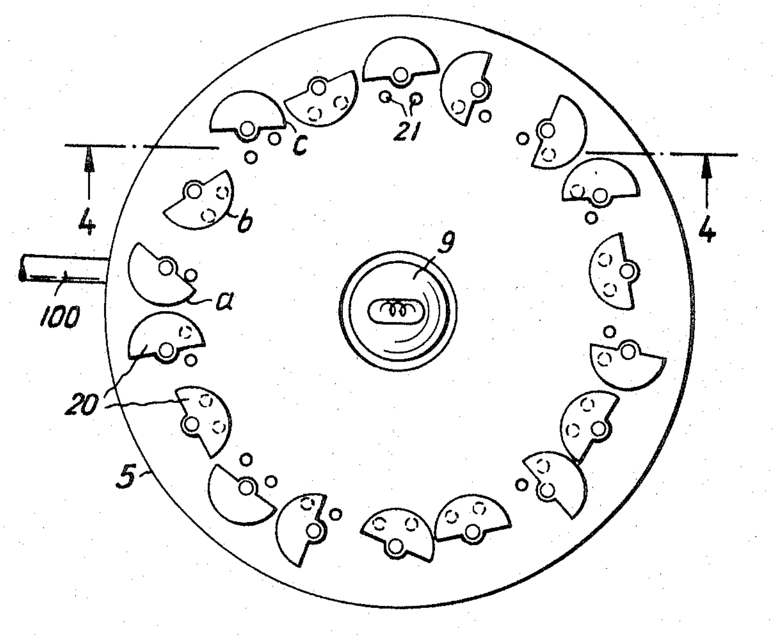
FIGURE 3 is a plan view of another embodiment of a converter according to the present invention, without a cover, taken along line 3—3 of FIGURE 4.
Figure 4:
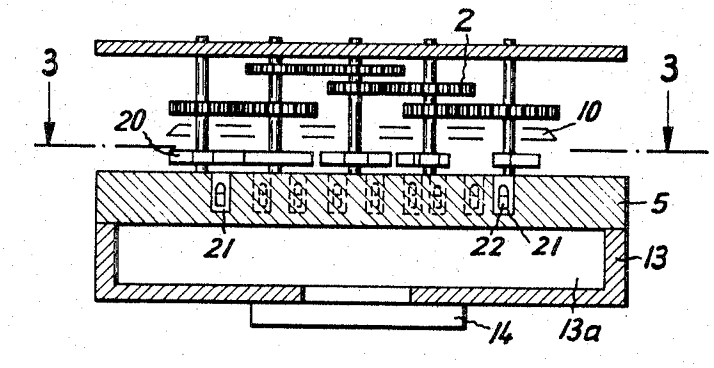
FIGURE 4 is a sectional view of the converter illustrated in FIGURE 3, taken along line 4—4 of FIGURE 3.

In the embodiment shown in FIGURES 3 and 4, the shutters 20 are in the form of semi-circular plates, these plates being coupled to each other by means of gearing 2 in the manner described above. The shutters 20 sweep over bores 21 within which photosensitive diodes 22 or the like are arranged. The outputs of the diodes are interconnected by means of the logic circuit 13*a* arranged in support 13, in the manner described in Patent No. 3,257,656. The light emanating from light source 9 is deflected so as to be directed toward the diodes 22 by means of disc 10.

The remaining structure of the embodiment of FIGURES 3 and 4 is similar to that of the embodiment of FIGURES 1 and 2. The operation of both embodiments is identical, the input to the converter being again connected to the shutter forming part of the unit constituting the lowest order digit $2^0$.

It will be seen from the above that a rotary analog-digital converter according to the present invention is characterized, basically, by the fact that there is a light source (9), as well as a plurality of successive units each incorporating photoelectric means (4, 22) positioned to be elluminated by the light source and a rotatably mounted shutter (1, 20) for covering and uncovering such photoelectric means with respect to the light source. Reduction gearing (2) interconnects each shutter with the shutter of the next succeeding unit. Analog input means (100) are provided for driving the shutter of the first of the plurality of successive units, there being logic circuit means (13*a*) connected with the photoelectric means for producing a digital output. In this way, the analog input applied to the converter produces a digital output that can be taken off the output of the logic circuit means. As applied to a machine tool, the input value may be the position of the work tool along the machine frame, in which case the shaft 100 may be suitably interconnected to the drive spindle which moves the work tool along the machine frame.

It will be understood that the above description of the present invention is susceptible to various modifications, changes, and adaptations, and the same are intended to be comprehended within the meaning and range of equivalents of the appended claims.

What is claimed is:

1. A rotary analog-digital converter comprising, in combination:
   (a) a light source;
   (b) a plurality of successive units arranged along a circle, each unit incorporating photoelectric means positioned to be illuminated by said light source and a rotatably mounted shutter for covering and uncovering such photoelectric means with respect to said light source;
   (c) reduction gearing interconnecting each shutter with the shutter of the next succeeding unit; and
   (d) input means for driving the shutter of the first of said plurality of successive units.

2. A converter as defined in claim 1 wherein said units are arranged next to each other in approximately the same plane.

3. A converter as defined in claim 1 wherein said light source is arranged within said circle.

4. A converter as defined in claim 1 wherein each of said shutters comprises a cylindrical element provided with an opening, the photoelectric means being arranged within the respective shutter so that said photoelectric means are covered or uncovered depending on the angular position of said cylindrical element.

5. A converter as defined in claim 1 wherein each of said shutters comprises a plate which is a sector of a circle and which sweeps over the respective photoelectric means so that the latter are covered or uncovered depending on the angular position of said plate.

6. A converter as defined in claim 5 wherein said plate is semi-circular.

7. A rotary analog-digital converter comprising, in combination:
   (1) a light source;
   (2) a plurality of successive units arranged along a circle, each unit incorporating photoelectric means positioned to be illuminated by said light source and a rotatably mounted shutter for covering and uncovering such photoelectric means with respect to said light source;
   (3) logic circuit means connected to said photoelectric means for producing a digital output;
   (4) reduction gearing interconnecting each shutter with the shutter of the next succeeding unit; and
   (5) analog input means for driving the shutter of the first of said plurality of successive units.

References Cited

UNITED STATES PATENTS

| | | | |
|---|---|---|---|
| 2,779,539 | 1/1957 | Darlington | 340—347 |
| 3,207,121 | 9/1965 | Steiner | 340—347 |

OTHER REFERENCES

Photoelectric Decimal Coded, Shaft Digitizer, by Libaw and Craig, pages 1–4, September 1953.

MAYNARD R. WILBUR, *Primary Examiner.*

K. R. STEVENS, W. J. KOPACZ, *Assistant Examiners.*